(12) United States Patent
Genghammer et al.

(10) Patent No.: US 10,527,714 B2
(45) Date of Patent: Jan. 7, 2020

(54) CALIBRATION DEVICE AND CALIBRATION METHOD FOR CALIBRATING ANTENNA ARRAYS

(71) Applicant: Rohde & Schwarz GmbH & Co. KG, Munich (DE)

(72) Inventors: Andreas Genghammer, Munich (DE); Ralf Juenemann, Munich (DE); Sherif Ahmed, Starnberg (DE); Frank Gumbmann, Nuremberg (DE)

(73) Assignee: ROHDE & SCHWARZ GMBH & CO. KG, Munich (DE)

( * ) Notice: Subject to any disclaimer, the term of this patent is extended or adjusted under 35 U.S.C. 154(b) by 376 days.

(21) Appl. No.: 15/407,983

(22) Filed: Jan. 17, 2017

(65) Prior Publication Data
US 2018/0136313 A1    May 17, 2018

Related U.S. Application Data (60) Provisional application No. 62/423,461, filed on Nov. 17, 2016.

(51) Int. Cl.
*G01S 7/40*    (2006.01)
*G01S 13/88*    (2006.01)

(52) U.S. Cl.
CPC ........... *G01S 7/4026* (2013.01); *G01S 13/887* (2013.01)

(58) Field of Classification Search
CPC ........ G01S 7/40; G01S 7/4008; G01S 7/4021; G01S 2007/406; G01S 2007/4082; G01S 2007/4086; G01S 2007/4091; G01S 2007/4095; G01S 13/887
See application file for complete search history.

(56) References Cited

U.S. PATENT DOCUMENTS

| | | | | |
|---|---|---|---|---|
| 3,573,826 A | * | 4/1971 | Fredericks | ............ G01S 7/4021 342/174 |
| 4,283,725 A | * | 8/1981 | Chisholm | ................. G01S 7/40 342/174 |
| 4,972,192 A | * | 11/1990 | Bruder | .................. G01S 7/4052 342/171 |

(Continued)

FOREIGN PATENT DOCUMENTS

| | | |
|---|---|---|
| DE | 3911373 C2 | 8/2000 |
| GB | 2534555 A * | 8/2016 ............... H01Q 3/08 |
| WO | 2013174807 A1 | 11/2013 |

*Primary Examiner* — Peter M Bythrow
(74) *Attorney, Agent, or Firm* — Ditthavong & Dteiner, P. C.

(57) ABSTRACT

A calibration device for calibrating an antenna array is provided. The calibration device comprises a transmitter, which is configured for transmitting a first calibration signal to all antennas of the antenna array, resulting in a plurality of received first calibration signals provided by the antenna array to the calibration device. Moreover, the calibration device comprises a receiver, which is configured for receiving a plurality of second calibration signals from the antennas of the antenna array. Finally, the calibration device comprises an antenna characteristic calculator, which is configured for calculating an antenna characteristic of each individual antenna of the antenna array based on the plurality of received first calibration signals and the plurality of received second calibration signals.

15 Claims, 9 Drawing Sheets

(56) References Cited

U.S. PATENT DOCUMENTS

| | | | | |
|---|---|---|---|---|
| 5,412,414 A * | 5/1995 | Ast | ........................ | G01S 7/4017 342/174 |
| 5,546,090 A * | 8/1996 | Roy, III | .................. | H01Q 1/246 342/174 |
| 6,037,898 A * | 3/2000 | Parish | .................... | H01Q 3/267 342/174 |
| 6,133,868 A * | 10/2000 | Butler | .................... | H01Q 3/267 342/165 |
| 6,363,619 B1 * | 4/2002 | Schirmer | ................ | G01B 11/27 33/288 |
| 6,836,675 B2 * | 12/2004 | Zhang | .................. | H04W 24/02 342/357.395 |
| 6,927,725 B2 * | 8/2005 | Wittenberg | ............ | G01S 7/4004 342/165 |
| 9,467,219 B2 * | 10/2016 | Vilhar | .................... | G01R 29/10 |
| 2002/0105456 A1 * | 8/2002 | Isaji | ...................... | G01S 7/4026 342/165 |
| 2003/0090411 A1 * | 5/2003 | Haney | ................... | G01S 7/4026 342/165 |
| 2004/0003951 A1 * | 1/2004 | Kikuchi | ................. | G01S 7/4026 180/169 |
| 2004/0080448 A1 * | 4/2004 | Lovberg | ................ | G01S 13/887 342/22 |
| 2014/0169509 A1 * | 6/2014 | Tsofe | .................... | H01Q 3/267 375/344 |
| 2014/0227966 A1 * | 8/2014 | Artemenko | .......... | H01Q 1/1257 455/9 |
| 2014/0347206 A1 * | 11/2014 | Steinlechner | ......... | G01S 7/4026 342/5 |
| 2015/0309161 A1 * | 10/2015 | Giunta | ................... | G01S 7/4021 342/59 |
| 2017/0212215 A1 * | 7/2017 | Hellinger | ............... | G01S 7/4026 |
| 2017/0373371 A1 * | 12/2017 | Gabriel | ................... | H01Q 3/08 |

\* cited by examiner

Fig. 10

CALIBRATION DEVICE AND CALIBRATION METHOD FOR CALIBRATING ANTENNA ARRAYS

RELATED APPLICATION

The present application claims priority to U.S. Provisional Application No. 62/423,461, filed Nov. 17, 2016, the entire contents of which is herein incorporated by reference.

TECHNICAL FIELD

The invention relates to a calibration device and method for calibrating antenna arrays, especially for calibrating antenna arrays used for performing body scans. Also, the invention relates to an according antenna array and body scanner.

BACKGROUND ART

In recent years, the use of radio frequency imaging for performing body scans for security purposes has been on the rise. In order to calibrate according antenna arrays, complicated calibration procedures so far have to be followed. Especially, a great deal of different calibration standards have to be measured. Also, the large size of such calibration standards is problematic.

For example, the document WO 2013/174807 A1 shows a calibration system and method for calibrating an according antenna array. The system and method shown there though are disadvantageous, since very unwieldy calibration standards have to be measured using the antenna array.

This makes it necessary to decommission the according scanner employing the antenna array, and leaving the respective checkpoint without a scanner or requiring additional scanners.

Accordingly, the object of the invention is to provide a calibration device and calibration method, which allow for an accurate calibration of an antenna array while at the same time requiring only a low number of small-footprint calibration standards for performing the calibration measurements.

SUMMARY OF THE INVENTION

According to a first aspect of the invention, a calibration device for calibrating an antenna array is provided. The calibration device comprises a transmitter, which is configured for transmitting a first calibration signal to all antennas of the antenna array, resulting in a plurality of received first calibration signals provided by the antenna array to the calibration device. Moreover, the calibration device comprises a receiver, which is configured for receiving a plurality of second calibration signals from the antennas of the antenna array. Finally, the calibration device comprises an antenna characteristic calculator, which is configured for calculating an antenna characteristic of each individual antenna of the antenna array based on the plurality of received first calibration signals and the plurality of received second calibration signals. It is thereby possible to determine the antenna characteristics of each individual antenna accurately without requiring large-scale calibration standards.

According to a first preferred implementation form of the first aspect, the calibration device moreover comprises a reflection unit, which is configured for reflecting, with a first reflection characteristic, a third calibration signal successively transmitted by the antennas of the antenna array and received simultaneously by the antennas of the antenna array as a plurality of received third calibration signals, and reflecting, with a second reflection characteristic different from the first reflection characteristic, a fourth calibration signal successively transmitted by the antennas of the antenna array and received simultaneously by the antennas of the antenna array as a plurality of received fourth calibration signals. Therefore, only two different reflectors within the reflection unit are necessary for performing all calibration measurements. These reflectors do not have to have a large size.

According to a further preferred implementation form of the first aspect, the calibration device furthermore comprises a calibration parameter determining unit, which is configured for determining the calibration parameters of the antenna array based upon the plurality of received first calibration signals, the plurality of received second calibration signals, the plurality of received third calibration signals and the plurality of received fourth calibration signals. It is thereby possible to determine the calibration parameters of the antenna array in an accurate manner without requiring the use of a large number of calibration standards or the use of large-scale calibration standards.

According to a further preferred implementation form of the first aspect, the transmitter, the receiver and the reflection unit are arranged in known positions with regard to the antenna array and to each other. This allows for a very accurate calibration.

According to a further preferred implementation form of the first aspect, the calibration device moreover comprises a calibration parameter determining unit, configured for determining calibration parameters of the antenna array based upon the plurality of received first calibration signals, the plurality of received second calibration signals, the plurality of received third calibration signals, the plurality of received fourth calibration signals, and the known positions of the transmitter, the receiver and the reflection unit. A further increase of the accuracy of determining the calibration parameters is thereby possible.

According to a further preferred implementation form of the first aspect, the reflection unit comprises a first reflector, configured for reflecting the third calibration signals with the first reflection characteristic and a second reflector, configured for reflecting the fourth calibration signals with the second reflection characteristic. This allows for an especially simple to implement construction of the reflection unit.

According to a further preferred implementation form of the first aspect, the reflection unit comprises a single switchable reflector, which is switchable between the first reflection characteristic and the second reflection characteristic. This allows for an especially small-scale construction of the reflection unit.

According to a further preferred implementation form of the first aspect, the single switchable reflector is configured for being switched between the first reflection characteristic and the second reflection characteristic by moving and/or rotating at least one surface of the switchable reflector and/or switching a liquid crystal between different states. This allows for a very small-scale implementation of the reflection unit.

According to a further preferred implementation form of the first aspect, the transmitter is configured for transmitting the first calibration signal to all antennas of the antenna array simultaneously and the receiver is configured for successively receiving the second calibration signals from all antennas of the antenna array. This allows for an especially quick calibration process.

According to a further preferred implementation form of the first aspect, the calibration device comprises a plurality of transmitters, which is configured for successively transmitting a first calibration signal to all antennas of the antenna array, resulting in a plurality of received first calibration signals for each of the transmitters of the plurality of transmitters.

Moreover, in this case the calibration device comprises a plurality of receivers, configured for successively receiving a plurality of second calibration signals from the antennas of the antenna array for each receiver of the plurality of receivers. The antenna characteristic calculator is then configured for calculating the antenna characteristic of each antenna of the antenna array based on the plurality of received first calibration signals of all transmitters of the plurality of transmitters and the plurality of received second calibration signals of all receivers of the plurality of receivers. This allows for an averaging of the plurality of first calibration signals and of the plurality of second calibration signals thereby minimizing a negative effect of clutter within the measurement environment.

According to a second aspect of the invention, an antenna array comprising a calibration device according to the first implementation form of the first aspect is provided.

According to a third aspect of the invention, an antenna array system, comprising a first antenna array according to the second aspect and a second antenna array according to the second aspect is provided. The calibration device of the first antenna array is configured for calibrating the second antenna array, while the calibration device of the second antenna array is configured for calibrating the first antenna array. Especially in body scanners employing to antenna arrays, this allows for a very quick and efficient calibration.

According to a first preferred implementation form of the third aspect, the transmitter, the receiver and the reflection unit of the calibration device of the first antenna array is integrated into a surface of the second antenna array. The transmitter, the receiver and the reflection unit of the calibration device of the second antenna array is integrated into a surface of the first antenna array. This allows for an especially simple construction of the antenna array system.

According to a second preferred implementation form of the third aspect, the antenna array system is a body scanner. The first antenna array is configured for scanning a first side of a person, while the second antenna array is configured for scanning a second side of a person. An especially efficient calibration of such a body scanner is possible.

According to a fourth aspect of the invention, a calibration method for calibrating an antenna array is provided. The method comprises transmitting a first calibration signal to all antennas of the antenna array, resulting in a plurality of received first calibration signals, provided by the antenna array. Moreover, the method comprises receiving a plurality of second calibration signals from the antennas of the antenna array. Finally, the method comprises calculating an antenna characteristic of each antenna of the antenna array based on the plurality of received first calibration signals and the plurality of received second calibration signals. It is thereby possible to determine the antenna characteristics of each individual antenna accurately and requiring no large-scale calibration standards.

According to a first preferred implementation form of the fourth aspect, the method comprises reflecting, with a first reflection characteristic, a third calibration signal successively transmitted by the antennas of the antenna array and received by the antennas of the antenna array as a plurality of received third calibration signals and reflecting, with a second reflection characteristic, a fourth calibration signal successively transmitted by the antennas of the antenna array and received by the antennas of the antenna array as a plurality of received fourth calibration signals, wherein the first reflection characteristic is different form the second reflection characteristic. Therefore, only two different reflectors within the reflection unit are necessary for performing all calibration measurements. These reflectors do not have to have a large size.

According to a further preferred implementation form of the fourth aspect, the method comprises determining calibration parameters of the antenna array based upon the plurality of received first calibration signals, the plurality of received second calibration signals, the plurality of received third calibration signals and the plurality of received fourth calibration signals. It is thereby possible to determine the calibration parameters of the antenna array in an accurate manner without requiring the use of a large number of calibration standards or the use of large-scale calibration standards.

BRIEF DESCRIPTION OF THE DRAWINGS

An exemplary embodiment of the invention is now further explained by way of example only with respect to the drawings, in which.

DETAILED DESCRIPTION OF THE PREFERRED EMBODIMENTS

Figure 1:
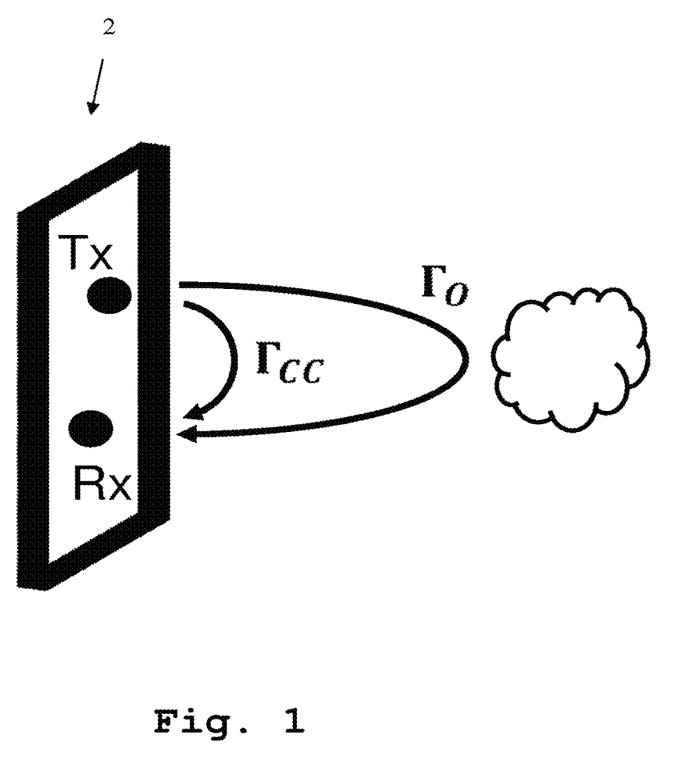
FIG. 1 shows a model of an antenna array and respective calibration parameters.

First, we demonstrate the underlying problem of calibrating an antenna array along FIG. 1. With regard to FIG. 2, the construction and function of an embodiment of a calibration device according to the first aspect of the invention is shown. Along FIG. 3-FIG. 5 further elaborations regarding the function of the calibration device is given. Along FIG. 6-FIG. 9 further details of the construction and function of embodiments of the different aspects of the invention are shown. Finally along FIG. 10 the function of an embodiment of the calibration method according to the fourth aspect is pictured. Similar entities and reference numbers in different figures have been partially omitted.

Reference will now be made in detail to the preferred embodiments of the present invention, examples of which are illustrated in the accompanying drawings. However, the following embodiments of the present invention may be variously modified and the range of the present invention is not limited by the following embodiments.

In FIG. 1, a model of an antenna array and respective calibration factors is shown. The antenna array 2 has two antennas, one for transmitting Tx and one for receiving Rx. This constitutes an error model for a multi-static radar system, exemplified along a by-static embodiment. The measuring signal M of an object is as follows:

$$M = T \cdot (\Gamma_O + \Gamma_{CC}), \text{ wherein}$$

T: frequency response of a sender and a receiver ($T = H_T H_R$);
$\Gamma_{CC}$: crosstalk between neighboring transmission- and reception antennas;
$H_T$: frequency response of the transmitter
$H_R$: frequency response of the receiver
$\Gamma_O$: reflection factor of the measuring object During a calibration, it is necessary to determine the unknown frequency responses of all involved antennas including transmission antennas and reception antennas. Also, it is necessary to determine the crosstalk between the antennas. In order to determine the reflection factor of the measuring object, the following formula is used:

$$\Gamma_O = \frac{M}{T} - \Gamma_{CC}$$

First Embodiment

Figure 2:
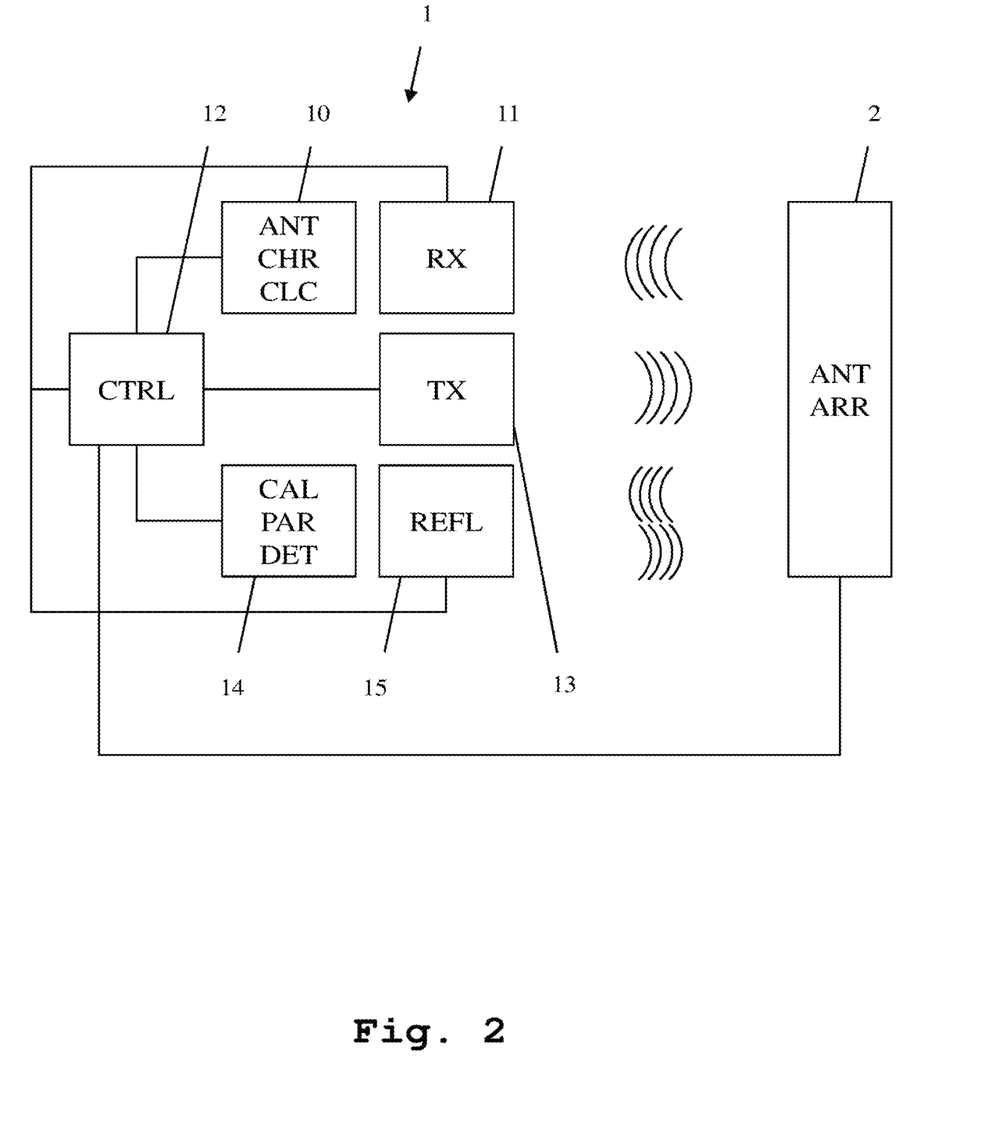
FIG. 2 shows a first embodiment of the calibration device according to the first aspect of the invention.

In FIG. 2, a first embodiment of the calibration device 1 for calibrating an antenna array 2 is shown. The calibration device 1 comprises an antenna characteristic calculator 10, a receiver 11, a control unit 12, a transmitter 13, a calibration parameter determining unit 14 and a reflection unit 15. The antenna characteristic calculator 10, the receiver 11, the transmitter 13, the calibration parameter determining unit 14 and the reflection unit 15 are each connected to the control unit and are controlled by it. The receiver 11, the transmitter 13 and the reflection unit 15 are arranged so that they face the antenna array 2 which is to be calibrated.

In a first step, the transmitter 13 transmits a first calibration signal to all antennas of the antenna array simultaneously. The first calibration signal is received by the individual antennas of the antenna array and provided to the control unit 12 by a data connection as a plurality of received first calibration signals. In a second step, the receiver 11 receives a plurality of second calibration signals from the antennas of the antenna array successively. In order for this step to happen, the control unit 12 of the calibration device 1 instructs the antenna array 2 to transmit the respective second calibration signal successively by all antennas of the antenna array.

The plurality of received first calibration signals and the plurality of received second calibration signals are handed to the antenna characteristic calculator 10 by the control unit 12. The antenna characteristic calculator 10 calculates an antenna characteristic for each individual antenna of the antenna array 2 therefrom.

Instead of only comprising a single receiver 11 and a transmitter 13, the calibration device 1 can also comprise a plurality of receivers and a plurality of transmitters. In this case, the afore-mentioned steps are repeated successively for each individual receiver and transmitter. The resulting signals can be averaged in order to reduce the effect of clutter within the measurement environment. This is explained in detail later on.

After determining the antenna characteristics, the antennas of the antenna array successively transmit a third calibration signal to the reflection unit 15. The signals are reflected by the reflection unit 15 using a first reflection characteristic. A plurality of reflected third calibration signals is received by the antennas of the antenna array. As a next step, the antennas of the antenna array successively transmit a fourth calibration signal to the reflection unit 15. The signals are reflected using a second reflection characteristic and received by the antennas of the antenna array as a plurality of received fourth calibration signals. The two different reflection characteristics are for example achieved by the reflection unit 15 and/or comprising two different reflection standards, or by comprising a single reflection standard, which is moved or rotated. Also the use of a liquid crystal, which is switched between two different states is possible. The third and fourth calibration signals may be identical, but do not have to be.

Finally, the plurality of received first calibration signals, the plurality of received second calibration signals, the plurality of received third calibration signals and the plurality of received fourth calibration signals are processed by the calibration parameter determining unit 14 in order to determine the calibration parameters. The exact mathematics will be explained later on.

In order to determine the calibration parameters, moreover the exact positioning of the transmitter 13, receiver 11, reflection unit 15 and antenna array 2 with regard to each other is necessary. This exact positioning can for example be previously determined or set by positioning the respective units at exactly determined locations.

Second Embodiment

Figure 3:
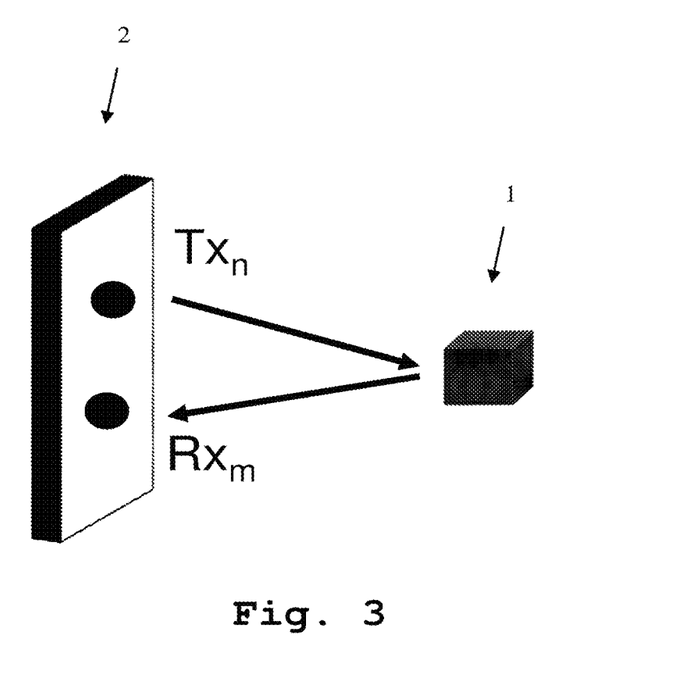
FIG. 3 shows a model of an antenna array and a second embodiment of the calibration device according to the first aspect of the invention.

In FIG. 3, an exemplary antenna array 2 and a calibration device 1 according to the first aspect of the invention is shown. Here, only a plurality of transmitted signals $Tx_n$ and a plurality of received signals $Rx_m$ are shown.

This shows the previously described first step of determining the antenna characteristics of each of the individual antennas of the antenna array 2.

Third Embodiment

Figure 4A:
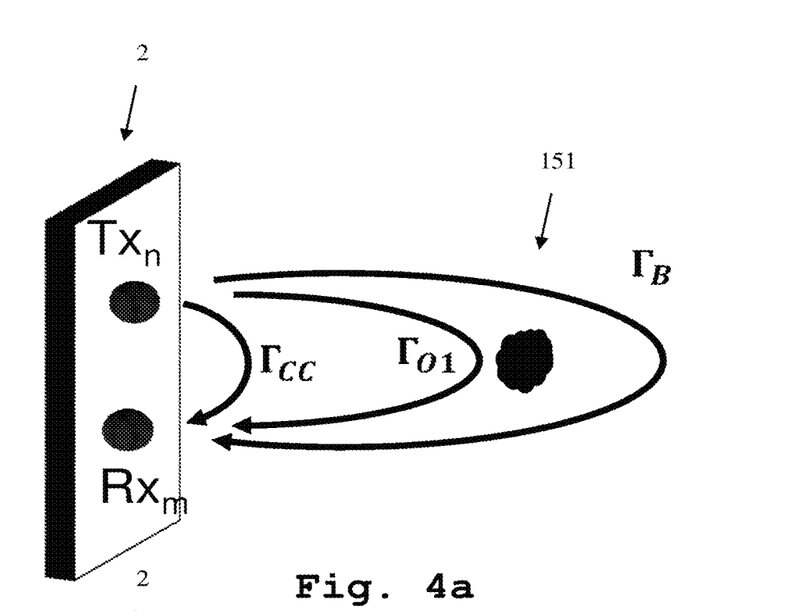
FIG. 4a shows a model of an exemplary antenna array and a number of calibration parameters.

In FIG. 4a, the second step, which was previously shown, is further explained. Especially, the measuring of the reflection of a first reflection standard 151 by an exemplary antenna array is shown. Respective coefficients are shown in FIG. 4a. $\Gamma_{CC}$ shows the crosstalk between the transmitter and receiver antenna. $\Gamma_{O1}$ shows the reflection of the object 151. $\Gamma_B$ shows the reflection of the surroundings.

Fourth Embodiment

Figure 4B:
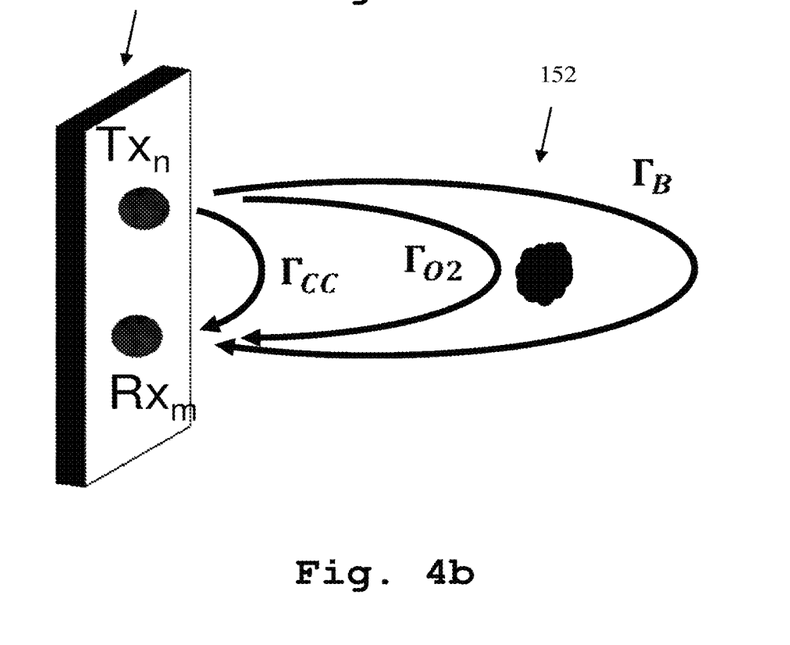
FIG. 4b shows a model of an exemplary antenna array and further exemplary calibration parameters.

In FIG. 4b, a similar situation as in FIG. 4a is depicted here. Here, a reflection with a second reflection standard 152 is shown. $\Gamma_{O2}$ shows the reflection by the second object 152.

Fifth Embodiment

Figure 5:
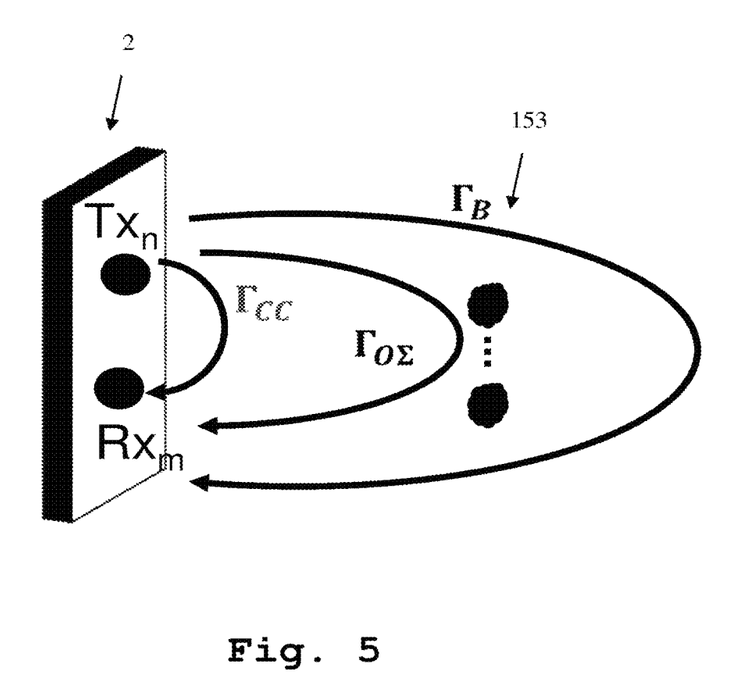
FIG. 5 shows a model of an antenna array and further calibration parameters.

In FIG. 5, the alternative use of two different reflection standards 153 in a same location is shown. Here, $\Gamma_{O\Sigma}$ corresponds to the reflection by the different objects 153 and the identical location.

Sixth Embodiment

Figure 6:
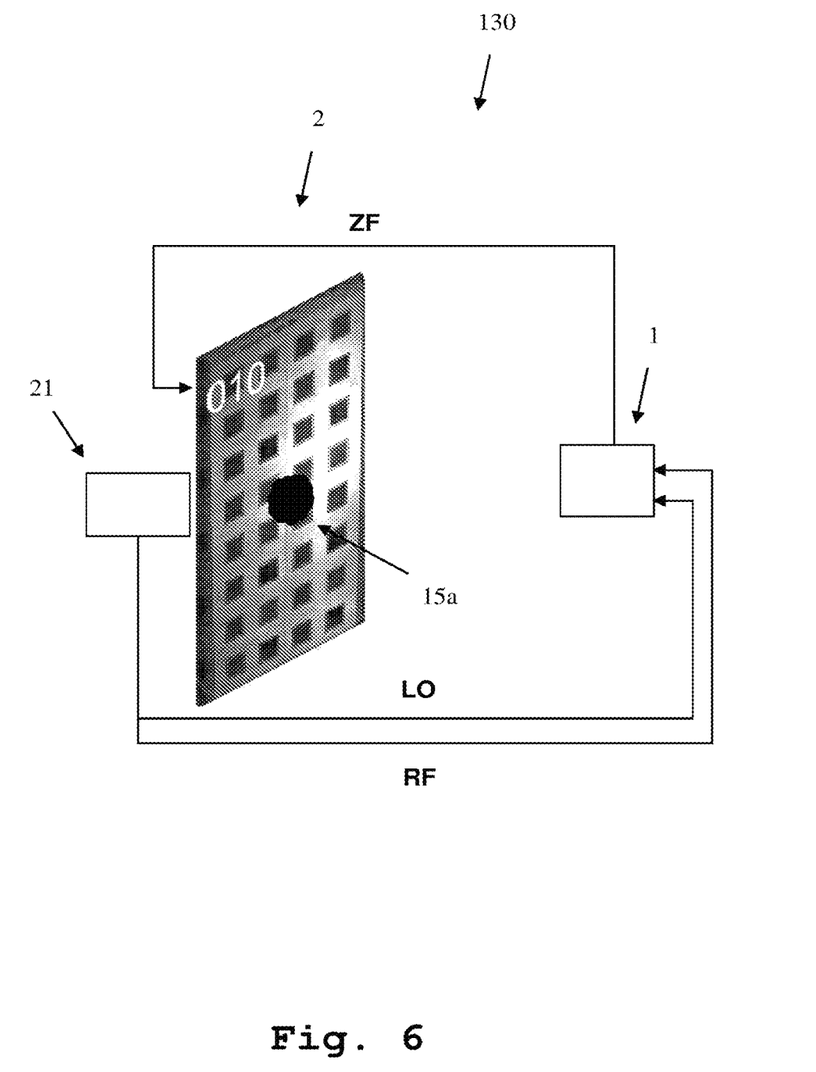
FIG. 6 shows a first embodiment of an antenna array according to the second aspect of the invention.

In FIG. 6 an antenna array system 130 comprising an antenna array 2 and a calibration device 1 is shown. The antenna array 2 here comprises an additional communication unit 21, which is set up for communicating with the calibration device 1. Especially, the communication unit 21 can be adapted for providing a local oscillator signal and a radio frequency signal to the calibration device 1, which in turn provides an intermediary frequency signal to the antenna array 2. In this embodiment, it can easily be seen that only if the calibration device 1 is placed sufficiently far from the antenna array 2, it is possible to perform all measurements using only single transmitter and receiver within the calibration device 1.

Alternatively, a number of calibration devices or at least a number of transmitters and receivers within a single calibration device can be placed in front of the antenna array 2 so as to cover all individual antennas of the antenna array.

Seventh Embodiment

Figure 7:
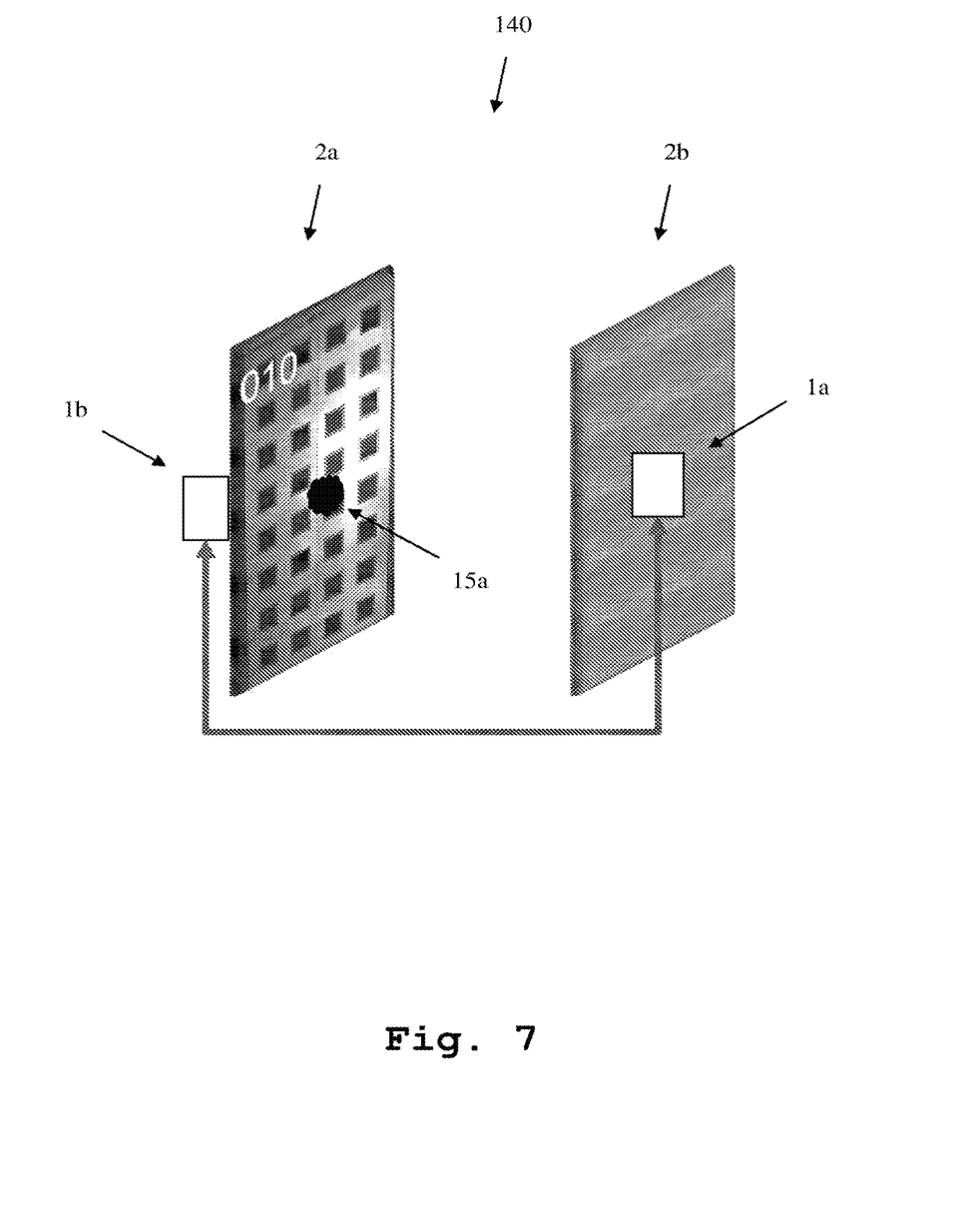
FIG. 7 shows a first embodiment of an antenna array system according to the third aspect of the invention.

In FIG. 7 an antenna array system 140 comprising two antenna arrays 2a, 2b are shown. Each antenna array 2a, 2b comprises a calibration device 1a, 1b. It is important to note that the first antenna array 2a comprises a calibration device 1a, which is integrated with the second antenna array 2b. The antenna array 2b comprises a calibration device 1b, which is integrated with the first antenna array 2a. Especially, the transmitter, receiver and reflection unit of the calibration device 1a is integrated with a surface of the antenna array 2b. At the same time a transmitter, receiver and reflection unit of the calibration device 1b is integrated with a surface of the antenna array 2a.

This setup is especially useful in body scanners, which have two antenna arrays for simultaneously or successively scanning two sides of a person. It is then possible for the two antenna arrays to calibrate each other. Especially the exact positioning of the individual units is very easy in this case, since the two antenna arrays and accordingly also the individual parts of the calibration devices are placed at fixed positions with regard to each other.

Since in the first step, already the antenna characteristics of each individual antenna are determined, also the phase relationships between the individual antennas of the antenna array 2 are known. It is therefore possible to perform a virtual focusing of the antenna array 2 on the reflection unit 15 during the second step. This makes it possible to use only very small reflectors within the reflection unit 15, since it is not necessary to have a strong reflection signal. By performing the virtual focusing, it is possible to retrieve even a very small reflection signal.

In the following, more information regarding the exact mathematics underlying the above-shown calibration device is given.

In a first option, an active calibration without a cluttered environment is shown. A non-cluttered environment means that there are no scattering objects within the environment. Especially a back-and-forth-reflection of signals between the antenna array 2 and the calibration device 1 is not accounted for. The following steps are performed:

1. Measuring of the receiving antennas and channels of the antenna array 2 using the transmitter 13 of the calibration device 1.
2. Measuring of the transmission antennas and channels of the antenna array 2 using the receiver 11 of the calibration device 2.
3. Estimating antenna characteristics, especially determining coefficient $C_{ap}$ for phase front correcting of the individual antennas of the antenna array 2.
4. Reflection measurement using first reflection characteristic.
5. Reflection measurement using second reflection characteristic.
6. Subtraction of both reflection measurements and phase front correction of measurement data using $C_{ap}$.
7. Coherent processing of aperture data and estimating of the frequency response of the transmitter 13 and receiver 11 of the calibration device 1.
8. Calculation of the final calibration coefficient C.

The goal of the calibration is to determine the calibration coefficient C, which comprises the unknown parameters regarding the phase correction and the unknown characteristics of the antennas of the antenna array 2.

For performing the first step, in multi-static array, a transmission channel n transmits a signal to a reception channel—the receiver 11. The transmission channel of the antenna array 2 has a frequency characteristic $H_{T,n}$. The receiver 11 has a frequency characteristic $H_{AR}$.

This is repeated for all transmission channels of the antenna array 2.

A respective measuring signal is as follows:

$$S_{T,n} = T_{T,n} \cdot H_{AR} \cdot A_{T,n}$$

After this, the transmitter 13 transmits to the individual reception channels of the antenna array 2. The transmitter has a frequency characteristic $H_{AT}$. The reception channel m of the antenna array 2 has the characteristic $H_{R,m}$ A respective measuring signal is as follows:

$$S_{R,m} = H_{R,m} \cdot H_{AT} \cdot A_{R,m},$$

wherein
$H_{T,n}$: frequency response transmitter n of antenna array
$H_{AR}$: frequency response of receiver
$A_{T,n}$: free space propagation
n: index of transmitter channel
$H_{R,m}$: frequency response receiver m of antenna array
$H_{AT}$: frequency response transmitter
$A_{R,m}$: free space propagation
m: index of reception channel In order to determine the characteristics of the individual antenna elements of the antenna array 2, the following formulas are used:

$$\tilde{H}_{T,n} = \frac{S_{T,n}}{A_{T,n,Sim}} = H_{T,n} \cdot H_{AR}$$

$$\tilde{H}_{R,m} = \frac{S_{R,m}}{A_{R,m,Sim}} = H_{R,m} \cdot H_{AT},$$

wherein
$A_{T,n,Sim}$, $A_{R,m,Sim}$: simulation of the free space propagation

Finally, the coefficient $C_{ap}$ for performing the phase front correction of the channels of the antenna array 2 are calculated as follows:

$$C_{ap,nm} = \tilde{H}_{T,n} \cdot \tilde{H}_{R,m} = H_{T,n} \cdot H_{R,m} \cdot H_{AT} \cdot H_{AR}$$

In the second step, the reflection measurement using the first reflector of the reflection unit 15 is performed. Here, the individual transmission channel the measuring signals are as follows:

Measuring signal $s_{\Gamma 1,nm}$:

$$s_{\Gamma 1,nm}=H_{T,n}H_{R,m}(A_{\Gamma 1,nm}\Gamma_{O1}+\Gamma_{CC,nm}+\Gamma_{B,nm})$$

Measuring signal $S_{\Gamma 2,nm}$:

$$s_{\Gamma 2,nm}=H_{T,n}H_{R,m}(A_{\Gamma 2,nm}\Gamma_{O2}+\Gamma_{CC,nm}+\Gamma_{B,n})$$

The resulting reflection measurements are subtracted from each other:

$$s_{\Gamma,nm}=s_{\Gamma 1,nm}-s_{\Gamma 2,nm}=H_{T,n}H_{R,m}(A_{\Gamma 1,nm}\Gamma_{O1}-A_{\Gamma 2,nm}\Gamma_{O2})$$

If the target position of the reflectors are nearly identical, the following relationships hold true:

$$A_{\Gamma 1,nm}\approx A_{\Gamma 2,nm}=A_{\Gamma 2,nm}=A_{\Gamma,nm}$$

$$s_{\Gamma,nm}=H_{T,n}H_{R,m}A_{\Gamma,nm}(\Gamma_{O1}-\Gamma_{O2}), \text{ wherein}$$

$A_{\Gamma 1,nm}$: free space propagation regarding reflector 1
$A_{\Gamma 2,nm}$: free space propagation regarding reflector 2
$A_{\Gamma,nm}$: by approximation free space propagation regarding reflector 1 and 2

Now a phase front correction of the measuring data using $C_{ap}$ is performed:

$$s_{\Gamma korr,nm}=s_{\Gamma,nm}=\frac{s_{\Gamma,nm}}{C_{ap,nm}}=\frac{A_{\Gamma,nm}}{H_{AT}H_{AR}}(\Gamma_{O1}-\Gamma_{O2})$$

After this, a coherent processing of the aperture data is performed:

A correction of the free space propagation and a coherent summation of the aperture data is performed. This increases the signal to know as ratio at the signal to clutter ratio due to the correlation gain.

$$s_{\Gamma sum}=\sum_{n,m}\frac{s_{\Gamma korr,nm}}{A_{\Gamma sim,nm}}=\frac{(\Gamma_{R1}-\Gamma_{R2})}{H_{AT}H_{AR}},$$

$A_{\Gamma sim,nm}$: simulation or model of the free space propagation regarding reflector 1 and 2

Estimation of the frequency response of the transmitter 13 and receiver 11:

$$\tilde{H}_{ACU}=\frac{(\Gamma_{O1}-\Gamma_{O2})}{s_{\Gamma sum}}=H_{AT}H_{AR}$$

This is under the assumption that the reflection factors $\Gamma_{O1}$ and $\Gamma_{O2}$ are known and identical for the all transmission and reception antenna combinations of the antenna array 2. This is for example given for a small metal plate as reflector.

Finally, the calibration coefficient C are calculated:

$$C_{n,m}=\frac{C_{ap,nm}}{\tilde{H}_{ACU}}=H_{T,n}\cdot H_{R,m}$$

The calibration factors C comprise the unknown frequency characteristics of the transmitter and the receiver and can be employed for all radar measurement data.

Eighth Embodiment

Figure 8:
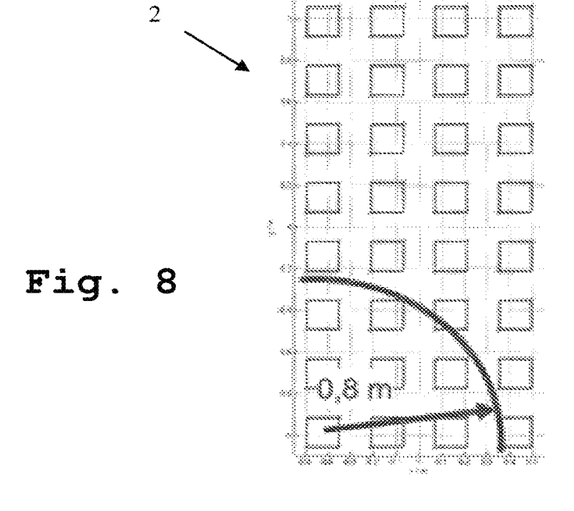
FIG. 8 shows an exemplary antenna array.

In FIG. 8, an antenna array 2 including a number of individual antennas is shown. There, a radius of 0.8 m is depicted. This is relevant for deciding if ambiguities need to be taken into account during processing. A characterization of the crosstalk between the different antennas is not necessary, if the following conditions are met:

If for example a bandwidth B=10 GHz and a number of frequency points $N_f$=128 are chosen, an unambiguous area of $c_0/2B(N_f-1)$=1.92 m. This means that a crosstalk is only relevant within a maximum of 0.8 m as depicted in FIG. 8. Within an area of 0 m-0.4 m and between 1.92 m until 2.32 m, ambiguity is possible.

Ninth Embodiment

Figure 9:
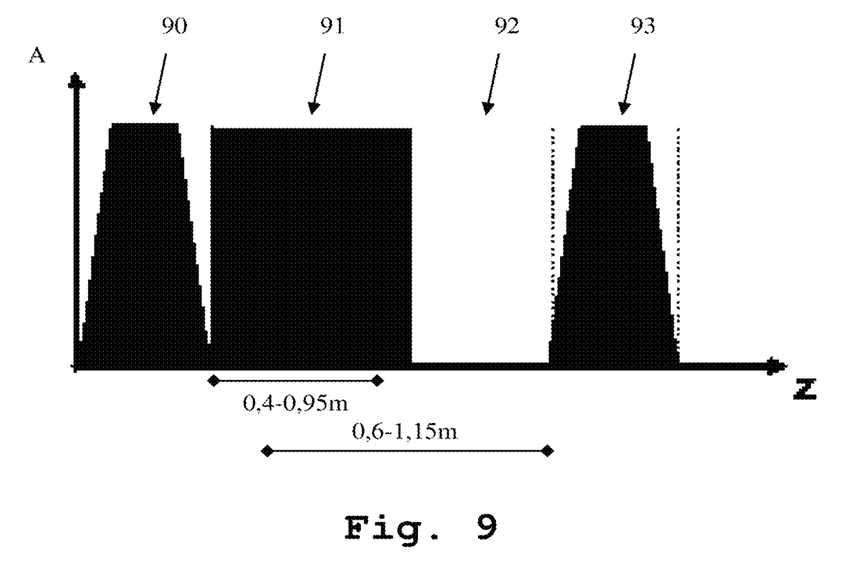
FIG. 9 shows a diagram illustrating the times of arrival of different measurement signals as used in an antenna array system according to the third aspect of the invention.

This is also shown in FIG. 9. There, in areas 90, 93 crosstalk is relevant. In area 91, and area 92, a scanning without crosstalk can be performed. The area 91 reaching from 0.4-0.95 m corresponds to one antenna array, while the area 92 reaching from 0.6-1.15 m corresponds to a second antenna array.

As a second option, an active calibration within a cluttered environment maybe performed. Such a cluttering for example occurs in antenna array systems using two antenna arrays, as for example shown in FIG. 7.

In order to take care of such a cluttered environment, the steps 1-3, as shown above are slightly modified. In this case, the calibration device 1 comprises not only a single transmitter and receiver, but a plurality of transmitters and receivers. This means that the first step of measuring the transmission channels of the antenna array 2 is successively performed using a number of transmitters of the calibration device 1. Also, the second step of measuring the reception channels of the antenna array 2 is successively performed using a plurality of transmitters of the calibration device. The resulting measuring signals are as follows:

$$s_{T,n}^{(q)}=H_{T,n}\cdot H_{AR,q}\cdot A_{T,nq}$$

$$s_{R,m}^{(p)}=H_{R,m}\cdot H_{AT,p}\cdot A_{R,mp}$$

$H_{T,n}$: frequency response antenna array transmitter n
$H_{AR,q}$: frequency response receiver q of calibration device
$A_{T,nq}$: free space propagation
n: index of the transmission channel
q: index of the receiver of the calibration device
$H_{R,m}$: frequency response antenna array receiver m
$H_{AT,p}$: frequency response transmitter p of calibration device
$A_{R,mp}$: free space propagation
m: index of the reception channel of the reception channel
p: index of the transmitter of the calibration device Now, an estimation of the frequency responses of the transmitter and receiver channels is performed:

After correcting the free-space propagation, the measurement data can be presented as follows:

$$s_{T,n}^{(q)}=H_{T,n}\cdot H_{AR,q}$$

$$s_{R,m}^{(p)}=H_{R,n}\cdot H_{AT,p}$$

In matrix notation:

$$S_{T|N\times Q} = H_{T|M\times 1} \cdot H_{AR|1\times Q} = \begin{bmatrix} H_{T,1}H_{AR,1} & H_{T,1}H_{AR,2} & \ldots & H_{T,1}H_{AR,Q} \\ H_{T,2}H_{AR,1} & H_{T,2}H_{AR,2} & \ldots & H_{T,2}H_{AR,Q} \\ \vdots & \vdots & \ddots & \vdots \\ H_{T,N}H_{AR,1} & H_{T,N}H_{AR,2} & \ldots & H_{T,N}H_{AR,Q} \end{bmatrix}$$

$$S_{R|P\times M} = H_{AT|P\times 1} \cdot H_{R|1\times M} = \begin{bmatrix} H_{AT,1}H_{R,1} & H_{AT,1}H_{R,2} & \ldots & H_{AT,1}H_{R,M} \\ H_{AT,2}H_{R,1} & H_{AT,2}H_{R,2} & \ldots & H_{AT,2}H_{R,M} \\ \vdots & \vdots & \ddots & \vdots \\ H_{AT,P}H_{R,1} & H_{AT,P}H_{R,2} & \ldots & H_{AT,P}H_{R,M} \end{bmatrix}$$

After scaling and averaging with regard to a reference measurement of a reference transmitter and receiver of the calibration device, the values are as follows:

$$\hat{H}_{AT,p} = \frac{1}{M} \cdot \sum_{m=1}^{M} \frac{s_{R,m}^{(p)}}{s_{R,m}^{(j)}} = \frac{H_{AT,p}}{H_{AT,j}} = \frac{H_{AT,p}}{H_{AT}^{(ref)}} \quad j \neq p$$

$$\hat{H}_{AR,q} = \frac{1}{N} \cdot \sum_{n=1}^{N} \frac{s_{T,n}^{(q)}}{s_{T,n}^{(i)}} = \frac{H_{AR,q}}{H_{AR,i}} = \frac{H_{AR,q}}{H_{AR}^{(ref)}} \quad i \neq q$$

With a reference measurement:

$$s_{R,m}^{(j)} = H_{AT,j}H_{R,m} = H_{AT}^{(ref)}H_{R,m}$$

$$s_{T,n}^{(i)} = H_{T,n}H_{AR,i} = H_{T,n}H_{AR}^{(ref)}$$

Written as vector:

$$\hat{H}_{AT|P\times 1} = [\hat{H}_{AT,1} \hat{H}_{AT,2} \ldots \hat{H}_{AT,P}]^T$$

$$\hat{H}_{AR|Q\times 1} = [\hat{H}_{AR,1} \hat{H}_{AR,2} \ldots \hat{H}_{AR,Q}]^T$$

Resulting in:

$$\check{H}_{T|N\times 1} = \frac{1}{Q} \cdot S_T \cdot \Lambda(\hat{H}_{AR})$$

$$\check{H}_{R|M\times 1} = \frac{1}{P} \cdot S_R^T \cdot \Lambda(\hat{H}_{AT})$$

$$\check{H}_{T,n} = H_{T,n} \cdot H_{AR}^{(ref)}$$

$$\check{H}_{R,m} = H_{R,m} \cdot H_{AT}^{(ref)}$$

Due to the two-fold averaging of the measurement data, it is possible to improve the signal to clutter ratio and the signal noise ration by the factor M·P for $\check{H}_R$ and N·Q for $\check{H}_T$. The observed clutter can be treated statistically like a speckle phenomenon in remote reconnaissance. Therefore, it can be considered as Gauss-distributed noise. This allows for the above-mentioned estimation of the signal to noise ratio and signal to clutter ratio gain.

Finally, the coefficients $C_{ap}$ for phase front correction of the transmission and reception channels is as follows:

$$C_{ap,nm} = \check{H}_{T,n} \cdot \check{H}_{R,m} = H_{T,n} \cdot H_{R,m} \cdot H_{AT}^{(ref)} \cdot H_{RT}^{(ref)}$$

The further processing along steps 4-8 occurs as earlier explained.

Tenth Embodiment

Figure 10:
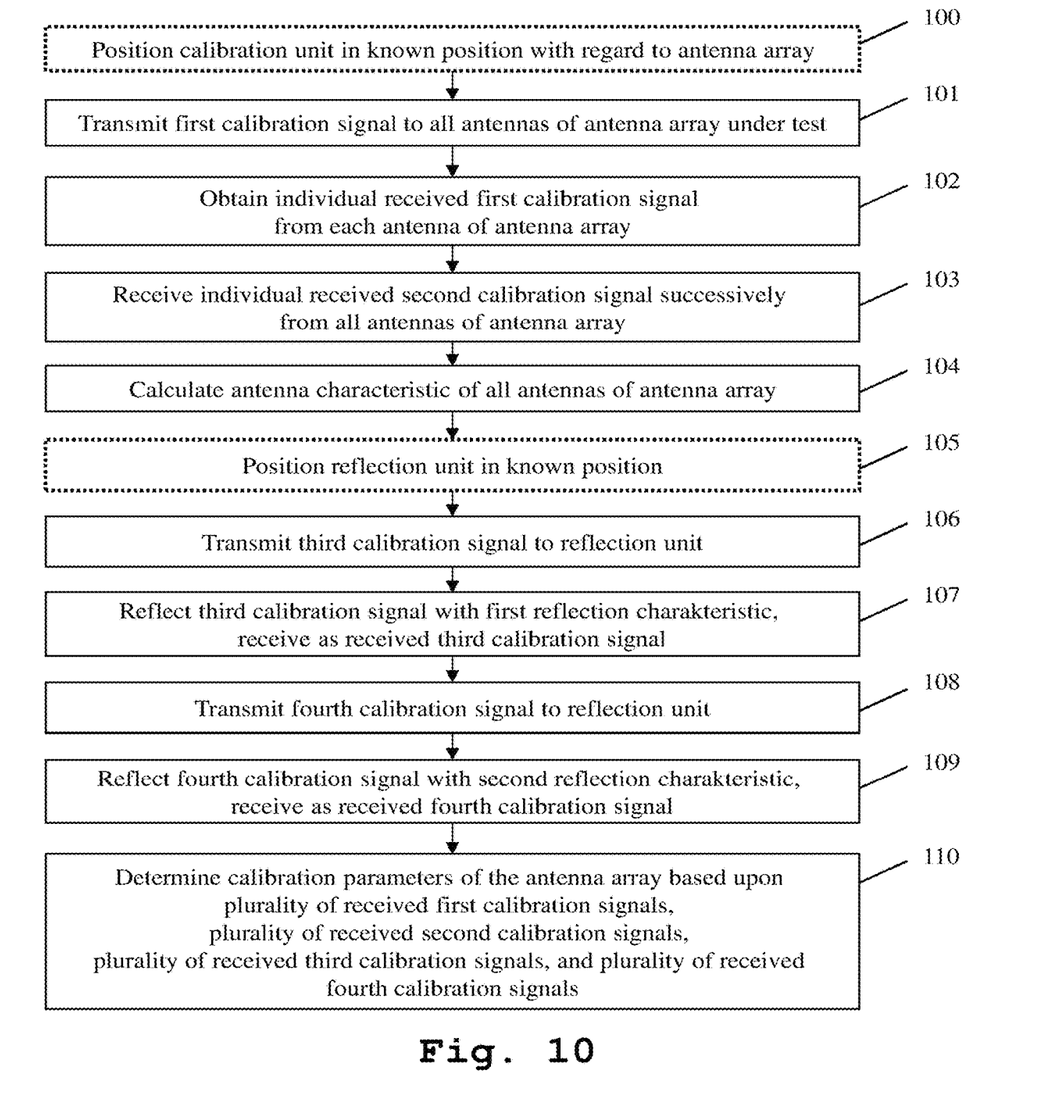
FIG. 10 shows a flow diagram of a calibration method according to fourth aspect of the invention.

Finally, in FIG. 10, an embodiment of the calibration method according to the fourth aspect of the invention is described in detail. In an optional first step 100, a calibration unit is positioned at a known position with regard to the antenna array to be calibrated. In a second step 101 a first calibration signal is transmitted to all antennas of the antenna array under test. In a third step 102, individual received first calibration signals from each of the antennas of the antenna array are obtained. In a fourth step 103, individual received second calibration signals are successively obtained from all antennas of the antenna array.

In a fifth step 104, antenna characteristics of all antennas of the antenna array are calculated. In an optional sixth step 105, a reflection unit is positioned in a known position with regard to the antenna array. In seventh step 106, a third calibration signal is transmitted to the reflection unit, successively by all antennas of the antenna array. In an eighth step 107, the third calibration signals are reflected by the reflection unit and received as a plurality of received third calibration signals by the antennas of the antenna array.

In a ninth step 108, a fourth calibration signal is successively transmitted to the reflection unit by the antennas of the antenna array and reflected thereby in a tenth step 109 and received as a plurality of fourth calibration signals. In a final eleventh step 110 calibration parameters of the antenna array are determined based upon the plurality of received first calibration signals, the plurality of received second calibration signals and received third and received fourth calibration signal.

The embodiments of the present invention can be implemented by hardware, software, or any combination thereof. Various embodiments of the present invention may be implemented by one or more application specific integrated circuits (ASICs), digital signal processors (DSPs), digital signal processing devices (DSPDs), programmable logic devices (PLDs), field programmable gate arrays (FPGAs), processors, controllers, microcontrollers, microprocessors, or the like.

Various embodiments of the present invention may also be implemented in the form of software modules, processes, functions, or the like which perform the features or operations described above. Software code can be stored in a memory unit so that it can be executed by a processor. The memory unit may be located inside or outside the processor and can communicate date with the processor through a variety of known means.

The invention is not limited to the examples. The characteristics of the exemplary embodiments can be used in any advantageous combination.

Although the present invention and its advantages have been described in detail, it should be understood, that various changes, substitutions and alterations can be made herein without departing from the spirit and scope of the invention as defined by the appended claims.

What is claimed is:

1. A calibration device for calibrating an antenna array, comprising:
   a transmitter, configured for transmitting a first calibration signal, substantially simultaneously to all antennas of the antenna array, resulting in a plurality of received first calibration signals, one received first calibration signal for each antenna of the antenna array, provided by the antenna array,
   a receiver, configured for receiving a plurality of second calibration signals successively from the individual antennas of the antenna array, resulting in a plurality of received second calibration signals, and
   an antenna characteristic calculator, configured for calculating an antenna characteristic of each antenna of the antenna array based on the plurality of received first calibration signals and the plurality of received second calibration signals, wherein the calibration device comprises a reflection unit, configured for:

reflecting, with a first reflection characteristic, a third calibration signal, successively transmitted by the individual antennas of the antenna array and for each successive transmission by one of the individual antennas of the antenna array, simultaneously received by all remaining antennas of the antenna array as a plurality of received third calibration signals, and reflecting, with a second reflection characteristic different from the first reflection characteristic, a fourth calibration signal, successively transmitted by the individual antennas of the antenna array for each successive transmission by one of the individual antennas of the antenna array, simultaneously received by all remaining antennas of the antenna array as a plurality of received fourth calibration signals.

2. The calibration device according to claim 1, comprising:

a calibration parameter determining unit, configured for determining calibration parameters of the antenna array based upon the plurality of received first calibration signals, the plurality of received second calibration signals, the plurality of received third calibration signals, and the plurality of received fourth calibration signals.

3. The calibration device according to claim 1, wherein the transmitter, the receiver and the reflection unit are arranged in known positions with regard to the antenna array and to each other.

4. The calibration device according to claim 3, comprising:

a calibration parameter determining unit, configured for determining calibration parameters of the antenna array based upon the plurality of received first calibration signals, the plurality of received second calibration signals, the plurality of received third calibration signals, the plurality of received fourth calibration signals, and the known positions of the transmitter, the receiver and the reflection unit.

5. The calibration device according to claim 1, wherein the reflection unit comprises:

a first reflector, configured for reflecting the third calibration signals with the first reflection characteristic, and a second reflector, configured for reflecting the fourth calibration signals with the second reflection characteristic.

6. The calibration device according to claim 1, wherein the reflection unit comprises a single switchable reflector, which is switchable between the first reflection characteristic and the second reflection characteristic.

7. The calibration device according to claim 6, wherein the single switchable reflector is configured for being switched between the first reflection characteristic and the second reflection characteristic by:

moving and/or rotating at least one surface of the single switchable reflector, and/or switching a liquid crystal between different states.

8. The calibration device according to claim 1, wherein the transmitter is configured for transmitting the first calibration signal to all antennas of the antenna array simultaneously, and wherein the receiver is configured for successively receiving the plurality of second calibration signals from all antennas of the antenna array.

9. The calibration device according to claim 1, comprising:

a plurality of the transmitters, configured for successively transmitting a first calibration signal to all antennas of the antenna array, resulting in a plurality of received first calibration signals for each of the transmitters of the plurality of transmitters, and a plurality of the receivers, configured for successively receiving a plurality of second calibration signals from the antennas of the antenna array for each receiver of the plurality of receivers, wherein the antenna characteristic calculator is configured for calculating the antenna characteristic of each antenna of the antenna array based on the plurality of received first calibration signals of all transmitters of the plurality of transmitters and the plurality of received second calibration signals of all receivers of the plurality of receivers.

10. An antenna array comprising a calibration device according to claim 1.

11. An antenna array system, comprising:

a first antenna array and a second antenna array according to claim 10, wherein the calibration device of the first antenna array is configured for calibrating the second antenna array, and wherein the calibration device of the second antenna array is configured for calibrating the first antenna array.

12. The antenna array system of claim 11, wherein the transmitter, the receiver and the reflection unit of the calibration device of the first antenna array is integrated into a surface of the second antenna array, and wherein the transmitter, the receiver and the reflection unit of the calibration device of the second antenna array is integrated into a surface of the first antenna array.

13. The antenna array system according to claim 11, wherein the antenna array system is a body scanner, wherein the first antenna array is configured for scanning a first side of a person, and wherein the second antenna array is configured for scanning a second side of a person.

14. A calibration method for calibrating an antenna array comprising:

transmitting a first calibration signal, substantially simultaneously to all antennas of the antenna array, resulting in a plurality of received first calibration signals, one received first calibration signal for each antenna of the antenna array, provided by the antenna array, receiving a plurality of second calibration signals successively from the individual antennas of the antenna array, resulting in a plurality of received second calibration signals, calculating an antenna characteristic of each antenna of the antenna array based on the plurality of received first calibration signals and the plurality of received second calibration signals, reflecting, with a first reflection characteristic, a third calibration signal, successively transmitted by the individual antennas of the antenna array and for each successive transmission by one of the individual antennas of the antenna array, received simultaneously by all remaining antennas of the antenna array as a plurality of received third calibration signals, and reflecting, with a second reflection characteristic different from the first reflection characteristic, a fourth calibration signal, successively transmitted by the individual antennas of the antenna array for each successive transmission by one of the individual antennas of the antenna array, received simultaneously by all remaining antennas of the antenna array as a plurality of received fourth calibration signals.

15. The calibration method according to claim 14, comprising determining calibration parameters of the antenna array based upon the plurality of received first calibration signals, the plurality of received second calibration signals, the plurality of received third calibration signals, and the plurality of received fourth calibration signals.

* * * * *